Nov. 17, 1959 E. V. LEONARD 2,913,635
STORAGE AND CONTROL DEVICE
Filed Dec. 23, 1955
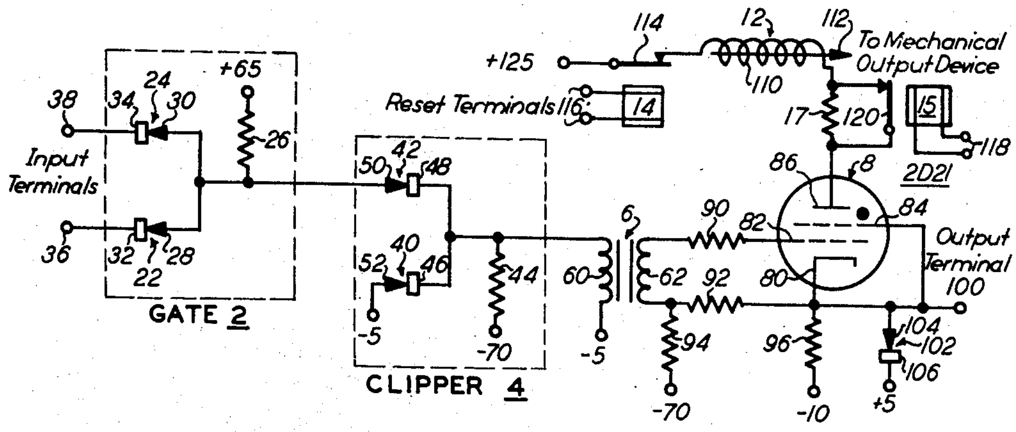
INVENTOR.
EUGENE LEONARD
BY S.C. Yuter
ATTORNEY.

2,913,635
Patented Nov. 17, 1959

2,913,635

STORAGE AND CONTROL DEVICE

Eugene V. Leonard, Port Washington, N.Y., assignor to Underwood Corporation, New York, N.Y., a corporation of Delaware Application December 23, 1955, Serial No. 555,079

4 Claims. (Cl. 317—123)

This invention relates to the storage of electronic signals representing data and to the use of electronic signals to initiate mechanical operations, and more particularly to a circuit for selectively storing an electrical pulse signal or for initiating a mechanical operation by a relatively weak electrical pulse signal.

In the field of electronics it is often necessary to store data represented by a pulse signal or to initiate a mechanical movement in response to a pulse signal. For example, in electronic data processing, storage devices are required for data entered into the apparatus by a mechanical input device, and a mechanical output device is usually employed to print the result of the data processing operation.

Control pulse signals are used to initiate the mechanical movements in the mechanical output device. These control pulses are usually generated when a plurality of other pulses occur simultaneously. The simultaneous occurrence of these pulses is detected by utilizing gating techniques such as a chain of electronic gating units. The control pulse produced by the chain of electronic gating units is required to initiate a mechanical movement. This is usually accomplished by causing a thyratron to conduct which in turn actuates a solenoid associated with the mechanical output device to initiate the desired mechanical movement.

Heretofore it has been necessary in some applications to provide an amplifier to amplify the control pulse in order to insure that the thyratron is always operated. It is also important that the time required to operate the thyratron be precise; that is, that the time required for the initiation of the mechanical movement be substantially constant. The time required to operate the thyratron is dependent on the amplitude, shape and duration of the input pulse.

Unfortunately the use of gating units tends to misshape and reduce the amplitude of the control pulses so that it has been necessary to provide amplifier circuits for amplifying the control pulse before transmittal to the thyratron circuit. The use of amplifier circuits increases the cost of the equipment.

It is also necessary to store data which is initially entered into data processing apparatus by means of a mechanical input device.

Therefore, an object of the invention is to provide an improved yet inexpensive circuit for storing input data or for initiating mechanical movement in response to output data.

Another object of the invention is to provide an improved circuit for initiating a mechanical movement in response to a relatively weak and poorly shaped pulse signal.

Still another object of the invention is to provide an improved thyratron circuit which is actuated in a predictable period of time after the occurrence of a pulse signal.

A further object of the invention is to provide improved apparatus for initiating mechanical movement in output devices of electronic data processing equipment.

Briefly, in accordance with the preferred embodiment of the invention, apparatus is provided to initiate a mechanical movement comprising a step-up transformer and a thyratron, the step-up transformer having a primary winding which is responsive to a pulse signal and a secondary winding coupled to the control grid of the thyratron. The anode of the thyratron is connected via a solenoid to an anode voltage source so that the occurrence of the input pulse signal produces an output signal having an amplitude which is increased by the step-up transformer to operate the thyratron and actuate the solenoid. The actuation of the solenoid initiates a mechanical movement in an associated mechanical output device. The pulse signal may be relatively weak and misshapen due to being passed by a gating device when a plurality of pulse signals occur simultaneously.

A major feature of the invention is means associated with the thyratron to prevent the actuation of the solenoid when the thyratron is operated in order that the thyratron may be used for information storage purposes. This feature allows the thyratron to be used as a temporary memory for entering data into associated data processing equipment.

Another feature of the invention is means coupled to the cathode of the thyratron to provide a positive output pulse signal signifying that the thyratron has been operated.

A further feature of the invention is means coupling the cathode of the thyratron to the secondary winding of the step-up transformer to provide positive feedback for increasing the speed and reliability of response of the thyratron circuit.

An advantage of the invention is that the voltage levels of the signal used to operate the thyratron may be conveniently chosen notwithstanding the voltage levels of the input signals.

Other objects, features and advantages will appear in the subsequent detailed description which is accompanied by a drawing wherein the sole figure illustrates apparatus which is responsive to store a pulse signal or to actuate a solenoid which initiates a mechanical movement in an output device, in accordance with the preferred embodiment of the invention.

Referring to the figure, the apparatus shown consists generally of a gate 2, a clipper 4, a transformer 6, a thyratron 8, a solenoid 12 and relays 14 and 15.

The gate 2 functions to pass a pulse when pulses are simultaneously present at its input terminals. Clipper 4 is utilized to discriminate against undesired noise signals and is adjusted to pass a pulse which has been passed by the gate 2. The transformer 6 is responsive to this pulse to increase the amplitude and change the voltage levels so as to readily and reliably operate the thyratron 8. The operation of a thyratron 8 produces a sudden flow of current through the solenoid 12 to actuate the solenoid 12 which initiates a mechanical movement in the associated mechanical output device. The relay 14 when actuated by a reset signal disconnects the anode supply voltage to the thyratron 8 causing the thyratron 8 to become nonconductive in order to allow the solenoid 12 to assume its nonactuated position and to be prepared to operate again.

When the thyratron 8 conducts a positive output signal appears at its cathode which is used to indicate that the thyratron is operated and which is fed back by the transformer 6 to provide positive feedback which increases the reliability of operation and speed of response of the thyratron 8.

If the relay 15 is energized, the resistor 17 in series with the solenoid 12 and the thyratron 8 limits the current flowing through the thyratron 8. This prevents the solenoid 12 from operating but allows the thyratron 8 to be used as a storage device. Thus, if a pulse operates the thyratron 8, the occurrence of the pulse is indicated by an increased cathode potential.

The gate 2 will usually be the last of a chain of gating units when employed to initiate a mechanical movement. The gate 2 consists of the diodes 22 and 24 and the resistor 26. The anodes 28 and 30 of the diodes 22 and 24 respectively are connected together and to one end of the resistor 26. The other end of the resistor 26 is connected to a positive supply voltage source 65. The cathodes 32 and 34 of the diodes 22 and 24 respectively are connected to input terminals 36 and 38 respectively. The gate 2 functions to pass the most negative input signal present at either of the input terminals 36 and 38. Therefore when positive input signals are simultaneously present at the input terminals 36 and 38 the gate 2 produces an output signal at the output terminal which is coupled to the clipper 4. In the usual case, this output signal will be of relatively low amplitude and misshapen.

The clipper 4 consists of the diodes 40 and 42 and the resistor 44. The cathodes 46 and 48 of the diodes 40 and 42 respectively are connected together and to one end of the resistor 44. The other end of the resistor 44 is connected to a negative supply voltage source 70. The anode 50 of the diode 42 is connected to the output terminal of the gate 2. The anode 52 of the diode 40 is connected to a negative supply voltage source 5. Clipper 4 is responsive to the most positive pulse present at either of the anodes 50 and 52 to pass an output pulse. Therefore, since the diode 40 is connected to a negative supply voltage source of minus five volts, the output voltage of the clipper 4 will never be less than minus five volts. Thus, any undesired signals present at the input to the clipper 4 having a magnitude of less than minus five volts will not be passed. Since the parameters of the circuitry of the apparatus shown in the figure has been designed (by way of example) to be responsive to input pulses having a swing from minus ten volts, signals having amplitudes which fall within the range of minus ten volts to minus five volts will not be passed by the clipper 4.

Therefore, when input pulse signals are simultaneously present at the input terminals 36 and 38 of the gate 2, a pulse which swings from minus five volts is passed by the clipper 4 to the transformer 6.

The transformer 6 comprises a primary winding 60 and a secondary winding 62. One end of the primary winding 60 is connected to the output terminal of the clipper 4. The other end of the primary winding 60 is coupled to the negative supply voltage source 5. The transformer 6 is a step-up transformer which produces a signal having more convenient voltage levels and a larger amplitude at the secondary winding 62 than the signal present at the primary winding 60. The larger amplitude signal is fed to the thyratron 8.

The thyratron 8 comprises the cathode 80, the control grid 82, the screen grid 84 and the anode 86. One end of the secondary winding 62 of the transformer 6 is connected via the resistor 90 to the control grid 82. The other end of the secondary winding 62 is connected by means of the resistor 92 to the cathode 80. The same end of the secondary winding 62 is connected to a negative supply voltage source 70 via the resistor 94. The cathode 80 is coupled to a negative supply voltage source 10 by means of the resistor 96. The output terminal 100 is coupled to the cathode 80.

A diode 102 is provided having its anode 104 connected to the cathode 80 and its cathode 106 coupled to a positive supply voltage source 5. The purpose of the diode 102 is to prevent the cathode voltage from rising above plus five volts, since the diode 102 will conduct when its anode reaches plus five volts or more.

Each of the diodes in the apparatus may be any unilateral conducting device, however, crystal diodes are preferable.

The solenoid 12 consists of the winding 110 and the bar 112. The winding 110 and the normally shorted resistor 17 connect the positive supply voltage source 125 via the normally closed contacts 114 of the relay 14 to the anode 86. When the thyratron 8 conducts, current flows through the coil winding 110 to actuate the bar 112 which in turn initiates a mechanical operation in the associated mechanical output device. This mechanical operation may be a print operation, a line feed, or a carriage return. Once the thyratron 8 is operated it remains conducting until a reset signal is received at the reset terminals 116 to actuate the relay 14 and briefly open the contacts 114. This interrupts the current flowing from the anode 86 to the cathode 80 of the thyratron 8 causing the thyratron 8 to become nonconductive and the solenoid 12 to assume its unactuated state.

If the relay 15 is energized by a signal at its terminal 118, the contacts 120 are opened. Thereafter, when the thyratron 8 is operated, the resistor 17 prevents the actuation of the solenoid 12 by limiting the thyratron 8 current. However, the increased thyratron 8 current is indicated by an increased cathode 80 potential. In this way, the thyratron 8 is used as a storage device, being reset by operation of relay 14.

It should be noted that the thyratron 8 may be fired by a single pulse fed to the junction of diodes 40 and 42 via a similarly connected diode.

The illustrated circuitry is designed for input pulses having a three to four microsecond duration which swing from minus ten volts, the amplitude depending on the previous circuitry. When two misshapen pulses of low amplitude, say plus two volts, are present at the input terminals 36 and 38 of the gate 2 a pulse which swings from minus ten to plus two volts is passed to the clipper 4. Clipper 4 in turn passes a signal which swings from about minus five volts to plus two volts to the transformer 6. The turns ratio of the transformer 6 is one to four in the illustrated example so that a pulse having an amplitude from about minus twenty volts to plus eight volts appears across the secondary winding 62 to fire the thyratron 8.

The normal potentials in the absence of input pulse signals are as follows: About minus twenty volts at the junction of the resistors 92 and 94 which function as grid bias resistors in conjunction with the resistor 96 so that a potential of about minus twenty volts is normally present at the grid 82. A potential of about minus fifteen volts is normally present at the cathode 80. Thus, when a pulse is received by the transformer 6 a pulse swinging from about minus twenty volts to plus eight volts occurs at the secondary winding 62.

The thyratron 8 conducts when the control grid 82 voltage rises above about minus fifteen volts which is approximately the potential of the cathode 80. The current which flows through the thyratron 8 increases the cathode 80 voltage which is fed back to the control grid 82 via the resistor 92, the secondary winding 62 and the resistor 90 to provide positive feedback. This positive feedback insures reliable and relatively rapid operation of the thyratron 8. The resistor 90 is used to prevent excessive control grid 82 current.

When the thyratron 8 is operated an anode current of about two hundred milliamperes flows and a positive step voltage appears at the output terminal 100 swinging from minus fifteen volts to plus five volts; the diode 102 limiting the voltage to plus five volts.

With the relay 15 energized, an anode current of about twenty-five milliamperes flows producing a similar positive step voltage which swings from minus fifteen volts to plus five volts at the output terminal 100. This current is insufficient to actuate the solenoid 12.

When relay 14 is actuated the voltage of the output terminal 100 returns to minus fifteen volts since the thyratron 8 becomes nonconductive.

Therefore, in accordance with the invention, apparatus has been provided which is responsive to the simultaneous occurrence of signals to initiate a mechanical movement even though the control signal received by the apparatus is relatively misshapen and of low amplitude. The apparatus may also selectively be used as a storage device. The apparatus is relatively inexpensive when compared with circuits used before to accomplish the same result. Further the positive feedback circuit insures reliable and rapid operation and a positive output signal is present to indicate that the apparatus has been operated. In addition, the voltage levels of the thyratron input signal may be conveniently chosen.

The following are the circuit parameters of a working embodiment of the invention responsive to input pulses of three to four microsecond duration which swing between minus ten volts and about plus two volts.

| | |
|---|---|
| Thyratron **8** | 2D21. |
| Transformer **6** | 1:4 ratio. |
| Diodes **22**, **24**, **40** and **46** | 1N34A. |
| Diode **106** | 1N91. |
| Solenoid **12** | 115 V.D.C. with coil resistance of 1,000 ohms. |
| Relays **14** and **15** | Single pole single throw. |
| Resistor **17** | 1,000 ohms. |
| Resistor **26** | 47,000 ohms. |
| Resistor **44** | 130,000 ohms. |
| Resistor **90** | 10,000 ohms. |
| Resistor **92** | 10,000 ohms. |
| Resistor **94** | 100,000 ohms. |
| Resistor **96** | 10,000 ohms. |

There will now be obvious to those skilled in the art many modifications and variations utilizing the principles set forth and realizing many or all of the objects and advantages but which do not depart essentially from the spirit of the invention.

What is claimed is:

1. Apparatus for storing a signal and selectively initiating a mechanical operation in an associated mechanical device comprising an input circuit, a thyratron connected to said input circuit, a solenoid connected to said thyratron, a power source connected to said thyratron, said solenoid and said input circuit to complete a current path, the occurrence of a signal at said input circuit operating said thyratron to actuate said solenoid and thereby give an output signal, means associated with said solenoid to initiate a mechanical operation in the associated mechanical device when said solenoid is actuated, and means for selectively preventing the actuation of said solenoid when said thyratron is operated.

2. Apparatus for initiating a mechanical operation in an associated mechanical device and storing data represented by a signal comprising an input circuit, a thyratron connected to said input circuit, a solenoid connected to said thyratron, a power source connected to said thyratron, said solenoid and said transformer to complete a current path, the occurrence of a signal at said step-up transformer operating said thyratron to actuate said solenoid, means connected to said thyratron to produce an output signal of a limited magnitude when said thyratron is operated, and means for preventing an operation of said solenoid when said thyratron is to be operated only for storage of the signal.

3. Apparatus for initiating a mechanical operation in an associated mechanical device and for storing data represented by a signal comprising an input circuit, a discharge tube energizable under control of said input circuit, a solenoid connected to said discharge tube, a power source connected to said discharge tube, said solenoid and said input circuit to complete a current path, the occurrence of a signal in said input circuit energizing said discharge tube to actuate said solenoid, means associated with said solenoid to initiate a mechanical operation in the associated mechanical device when said solenoid is actuated, means connected to said discharge tube to produce an output signal of limited voltage when said tube is energized, and means in said current path for selectively inserting impedance therein to prevent the operation of said solenoid without altering the voltage of said output signal when said discharge tube is energized.

4. Apparatus for initiating a mechanical operation in an associated mechanical device and for storing data comprising an input transformer, a thyratron having a control element connected to said input transformer, a solenoid connected to said thyratron, a power source connected to said thyratron, said solenoid and said transformer to complete a current path, the occurrence of a signal at said input transformer operating said thyratron to actuate said solenoid, means associated with said solenoid to initiate a mechanical operation in the associated mechanical device when said solenoid is actuated, feedback means connected in said current path to feed back an output signal to the control element of said thyratron to increase the speed of response of said thyratron circuit, and means in said current path to prevent said solenoid from being actuated when said thyratron is to be operated solely to indicate the occurrence of a signal.

References Cited in the file of this patent

UNITED STATES PATENTS

| | | |
|---|---|---|
| 1,733,045 | Baker | Oct. 22, 1929 |
| 2,431,316 | Dudley | Nov. 25, 1947 |
| 2,436,021 | Sepavich | Feb. 17, 1948 |
| 2,649,943 | Meyers | Aug. 25, 1953 |
| 2,652,136 | Morrison | Sept. 15, 1953 |
| 2,804,578 | Bergseth | Aug. 27, 1957 |